(12) United States Patent
Xiang et al.

(10) Patent No.: US 11,931,965 B2
(45) Date of Patent: Mar. 19, 2024

(54) 3D PRINTING METHOD AND DEVICE

(71) Applicant: ZHUHAI SAILNER 3D TECHNOLOGY CO., LTD., Zhuhai (CN)

(72) Inventors: Dongqing Xiang, Zhuhai (CN); Wei Chen, Zhuhai (CN); Linting Xie, Zhuhai (CN)

(73) Assignee: ZHUHAI SAILNER 3D TECHNOLOGY CO., LTD., Zhuhai (CN)

( * ) Notice: Subject to any disclaimer, the term of this patent is extended or adjusted under 35 U.S.C. 154(b) by 280 days.

(21) Appl. No.: 16/667,779

(22) Filed: Oct. 29, 2019

(65) Prior Publication Data

US 2020/0061928 A1  Feb. 27, 2020

Related U.S. Application Data (63) Continuation of application No. PCT/CN2018/086091, filed on May 9, 2018.

(30) Foreign Application Priority Data

Jul. 27, 2017 (CN) .......................... 201710626202.0

(51) Int. Cl.
*B29C 64/393* (2017.01)
*B29C 64/20* (2017.01)
(Continued)

(52) U.S. Cl.
CPC ............ *B29C 64/393* (2017.08); *B29C 64/20* (2017.08); *B33Y 30/00* (2014.12); *B33Y 50/02* (2014.12); *B33Y 10/00* (2014.12)

(58) Field of Classification Search
None
See application file for complete search history.

(56) References Cited

U.S. PATENT DOCUMENTS 5,321,622 A * 6/1994 Snead ................... B29C 64/124
700/182
2006/0155418 A1  7/2006 Bradbury
(Continued)

FOREIGN PATENT DOCUMENTS

CN    104503711 A    4/2015
CN    106156406 A    11/2016
(Continued)

OTHER PUBLICATIONS

Zhang et al., Build orientation optimization for multi-part production in additive manufacturing, Journal of Intelligent Manufacturing, vol. 28, pp. 1393-1407, Published: Feb. 28, 2015 (Year: 2015).*

(Continued)

*Primary Examiner* — Yung-Sheng M Tsui
(74) *Attorney, Agent, or Firm* — J.C. Patents (57) ABSTRACT

The disclosure provides a 3D printing method and device. The 3D printing method of the disclosure includes: obtaining height groups of an object to be printed in multiple different postures relative to a support platform, where different height groups include a height of the object to be printed in at least one direction corresponding to the different postures; obtaining a first height having a minimum height from all of the height groups, and obtaining a second height and a third height orthogonal to the first height according to the first height, where the second height and the third height are minimum heights in their respective directions; and taking directions in which the first height, the second height, and the third height are located as three printing directions of the object to be printed respectively, and printing. The disclosure can achieve a fast printing speed.

3 Claims, 8 Drawing Sheets

(51) Int. Cl.
  *B33Y 30/00* (2015.01)
  *B33Y 50/02* (2015.01)
  *B33Y 10/00* (2015.01)

(56) References Cited

U.S. PATENT DOCUMENTS

| | | | |
|---|---|---|---|
| 2007/0233298 A1 | 10/2007 | Heide | |
| 2010/0217429 A1* | 8/2010 | Kritchman | B29C 64/00 700/119 |
| 2015/0154321 A1* | 6/2015 | Schmidt | B29C 64/40 700/98 |
| 2016/0085882 A1* | 3/2016 | Li | G05B 19/4099 703/1 |
| 2018/0133969 A1* | 5/2018 | Huang | B29C 64/171 |
| 2020/0086624 A1* | 3/2020 | Daynes | B32B 5/14 |

FOREIGN PATENT DOCUMENTS

| | | |
|---|---|---|
| CN | 106393693 A | 2/2017 |
| CN | 106560314 A | 4/2017 |
| CN | 106808681 A | 6/2017 |
| CN | 106915076 A | 7/2017 |
| DE | 102016014276 A1 | 6/2017 |
| JP | H07329190 A | 12/1995 |
| JP | 2009532804 A | 9/2009 |
| JP | 2016097657 A | 5/2016 |
| JP | 6026688 B1 | 10/2016 |
| WO | WO-9711837 A1 * | 4/1997 ............. B29C 41/12 |
| WO | 2016/026820 A1 | 2/2016 |

OTHER PUBLICATIONS

The Notice of Allowance of JP application No. 2020-517250.
The International Search Report of corresponding international application No. PCT/CN2018/086091, dated Jul. 18, 2018.
The Chinese First Examination Report of corresponding Chinese application No. 201710626202.0, dated May 30, 2019.
Canellidis-V: "Generic-algorithm-based multi-objective optimization of the build orientation in stereolithography", Int. J Adv Manuf Technol (2009) 45:714-730.
Po-Ting-L: "Determining fabrication orientations for rapid prototyping with stereolithography apparatus", vol. 29, No. 1, pp. 53-62 1997.
The EESR of EP application No. 18838993.6.
First Office Action of the parallel European application EP 18838993.6.

\* cited by examiner

3D PRINTING METHOD AND DEVICE

CROSS-REFERENCE TO RELATED APPLICATIONS

This application is a continuation of International Application No. PCT/CN2018/086091, filed on May 9, 2018, which claims the priority benefit of Chinese Patent Application No. 201710626202.0, filed on Jul. 27, 2017. The contents of the above identified applications are incorporated herein by reference in their entireties.

TECHNICAL FIELD

The disclosure relates to the field of 3D printing, and in particular, to a 3D printing method and device.

BACKGROUND

3D Printing (3DP) technology, also known as Additive Manufacturing (AM) technology or Rapid Prototyping (RP) technology, is a stereoscopic construction technology of, based on a discrete-stacking principle, layering a model, printing layer by layer on a support platform, and then multi-layer stacking to finally make a target 3D object, including Fused Deposition Modeling (FDM) technology, Stereo Lithography Apparatus (SLA) technology, Selective Laser Sintering (SLA) technology, Digital Light Processing (DLP) technology, Laminated Object Manufacturing (LOM) technology, and inkjet technology, etc.

In a commonly used 3D printing technology, a 3D printing device first needs to model and layer an object to be printed, and then makes a print head print layer by layer on a support platform according to layered data, and finally forms the object to be printed by stacking. During the printing process, the print head reciprocates for scanning and printing movements to eject printed material at a correct location, and the relative height between the print head and the support platform also changes depending on a print layer.

However, in the current 3D printing technology, since the print head needs to reciprocate back and forth when printing data of each layer, it usually takes several hours to several tens of hours, depending on a size of the object to be printed, and when there are many printing jobs, the time consumed will increase proportionally, and the printing takes a long time overall.

SUMMARY

The disclosure provides a 3D printing method and device, which have a fast printing speed.

In a first aspect, the disclosure provides a 3D printing method, including:

obtaining height groups of an object to be printed in multiple different postures relative to a support platform, where different height groups include a height of the object to be printed in at least one direction corresponding to the different postures;

obtaining a first height having a minimum height from all of the height groups, and obtaining a second height and a third height orthogonal to the first height according to the first height, where the second height and the third height are minimum heights in their respective directions; and taking directions in which the first height, the second height, and the third height are located as three printing directions of the object to be printed respectively, and printing.

In a second aspect, the disclosure provides a 3D printing device, including: a print head, a support platform and a control unit, where the control unit and the print head are electrically connected, and the control unit is configured to perform the 3D printing method as described above to cause the print head to print the object to be printed on the support platform.

The 3D printing method of the disclosure specifically includes: first obtaining height groups of the object to be printed in multiple different postures relative to the support platform, where each of the height groups includes heights of the object to be printed in multiple different directions in a corresponding posture; then obtaining the first height having the minimum height, and the second height and the third height, which are orthogonal to the first height, from all of the height groups, where the second height and the third height are minimum heights in their respective directions; and finally taking directions in which the first height, the second height, and the third height are located as three printing directions of the object to be printed respectively, and printing. In this way, it is possible to keep a printing direction with a slow printing speed consistent with a direction in which the object to be printed has a small height, by orienting the object to be printed, so that a printing times of the object to be printed in directions are reduced, and an overall printing speed is improved.

BRIEF DESCRIPTION OF THE DRAWINGS

In order to illustrate the technical solutions of the embodiments of the disclosure or the prior art more clearly, the drawings required in the description of the embodiments or the prior art will be briefly described below. Obviously, the drawings in the following description are some embodiments of the disclosure, and other drawings can be obtained according to these drawings by those skilled in the art without creative efforts.

DESCRIPTION OF EMBODIMENTS

In order to make the objectives, technical solutions, and advantages of the embodiments of the disclosure more clear, the technical solutions in the embodiments of the disclosure will be clearly and completely described in the following with reference to the accompanying drawings of the embodiments of the disclosure. It is obvious that the described embodiments are only part of embodiments of the disclosure, but not all embodiments. All other embodiments obtained by those skilled in the art based on the embodiments of the disclosure without creative efforts are within the scope of the disclosure.

Embodiment 1

Figure 1:
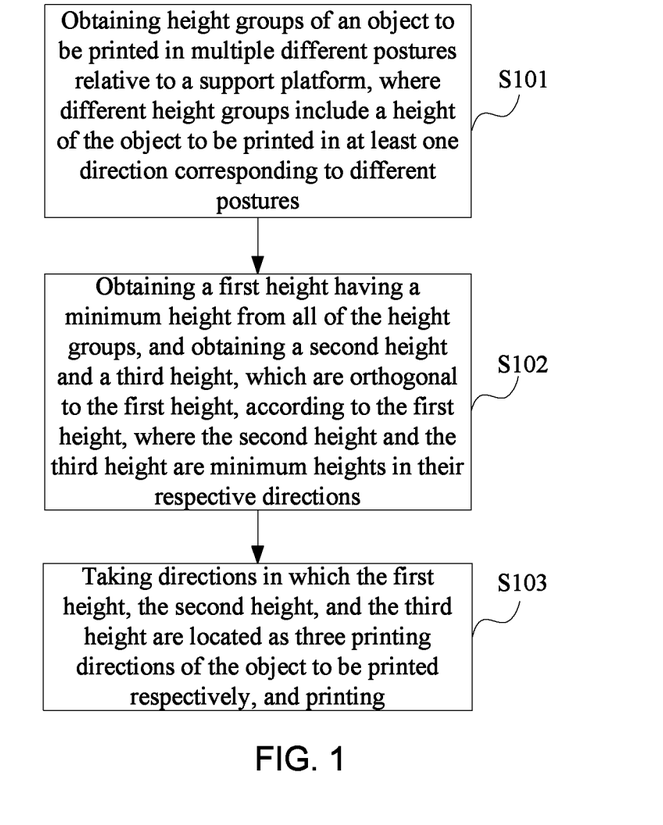
FIG. 1 is a schematic flowchart of a 3D printing method according to Embodiment 1 of the disclosure.

FIG. 1 is a schematic flowchart of a 3D printing method according to Embodiment 1 of the disclosure. As shown in FIG. 1, the 3D printing method provided in this embodiment specifically includes the following steps.

S101, obtaining height groups of an object to be printed in multiple different postures relative to a support platform, where different height groups include a height of the object to be printed in at least one direction corresponding to different postures.

Where the object to be printed may have a regular or irregular shape. In a conventional 3D printing process, a placement posture of the object to be printed is generally determined according to distribution of center of gravity of the object to be printed, for example, placed vertically or horizontally. In this embodiment, it is necessary to obtain multiple possible postures of the object to be printed on the support platform, that is, multiple different orientations that the object to be printed may present in a three-dimensional space. As such, since printing speeds of a 3D printing device in different printing directions are generally inconsistent, the object to be printed can be orientationally placed according to an optimal posture or orientation, for example, a longest size of its own is set towards a printing direction with a fastest printing speed so as to get a shortest printing time. Specifically, the number of different postures of the object to be printed on the support platform may be determined according to actual needs and processing capability of the 3D printing device. The more the number of orientations or postures that the object to be printed may present, the more accurate the result of obtaining an optimal orientation posture or an optimal orientation of the object to be printed, and the higher the requirement for the processing capability of the 3D printing device.

Corresponding to each of the different postures of the object to be printed, the object to be printed has different heights, i.e., the maximum size in each direction, in all directions when in the each of the different postures. Therefore, a height of the object to be printed in at least one direction when the object to be printed is in each different posture may be obtained, and height information corresponding to each posture is gathered in one height group, so that the height group includes a maximum size of the object to be printed in at least one direction in the each posture. At least one height of the height group can accurately describe a size of the object to be printed, thereby allowing the 3D printing device to perform selection according to the heights in different directions so as to select the optimal orientation posture of the object to be printed. The number of heights that need to be included in the height group is different depending on a height selection method. Each height group includes at least one height, and generally includes three heights orthogonal to each other so as to correctly describe a correct shape and size of the object to be printed in three-dimensional space.

S102, obtaining a first height having a minimum height from all of the height groups, and obtaining a second height and a third height, which are orthogonal to the first height, according to the first height, where the second height and the third height are minimum heights in their respective directions.

After obtaining multiple height groups corresponding to different postures of the object to be printed, it is necessary to find a minimum first height from all of the height groups, and to find a second height and a third height, which are orthogonal to the direction of the first height, by the first height, where the directions of the second height and the third direction are also perpendicular and orthogonal to each other, and the second height and the third height are minimum heights in their respective directions. Generally, when the three heights are to be obtained, the first height is first obtained, and then the second height and the third height are sequentially found on the basis of the first height. For example, after the first height is found, the second height is obtained according to the first height, and then the third height is obtained according to the second height and the first height; or after the first height is obtained, the third height is first obtained according to the first height, and then the second height is obtained according to the first height and the third height. The three heights thus obtained indicate three minimum height values in three different directions of the object to be printed in all possible postures.

It should be noted that, when obtaining the above heights, the first height may be located in one or more height groups, and when only one height group includes the first height, the second height and the third height orthogonal thereto may be directly found by the direction of the first height; and when multiple height groups include the first height, further screening in the height groups is required, and after the second height and the third height in each height group are obtained, a comparison is made between the multiple height groups to find a minimum second height and a minimum third height, and a first height corresponding to the minimum second height and the minimum third height.

S103, taking directions in which the first height, the second height, and the third height are located as three printing directions of the object to be printed respectively, and printing.

After obtaining the first height, the second height, and the third height, an optimal printing posture of the object to be printed is finally determined according to respective directions of the first height, the second height, and the third height. Since the printing speeds in directions are inconsistent when the 3D printing device is in operation, it is possible to assign the minimum height of the object to be printed to a direction in which the printing speed is the slowest, and assign other smaller height of the object to be printed to a direction in which the printing speed is slower, to reduce a printing time consumed in the direction in which the printing speed is the slowest, thereby increasing an overall speed at which the object to be printed is printed. As such, the 3D printing device can position directions of the first height, the second height, and the third height in the direction in which the printing speed of the object to be printed is the slowest, the direction in which the printing speed is slower, and the direction in which the printing speed is the fastest to print, respectively.

For example, a direction in which the first height is located may be taken as a layer stacking direction of the object to be printed, a direction in which the second height is located may be taken as a secondary printing direction of the object to be printed, and a direction in which the third height is located may be taken as a primary printing direction of the object to be printed. Since the 3D printing device is usually layered printing, each layer needs to perform an entire layer printing process, and each layer can only print a small thickness, and thus the printing speed in the layer stacking direction, that is, a layer stacking speed, of the object to be printed is the slowest, so that it is needed that the height of the object to be printed in this printing direction is small to reduce the printing time. When the object to be printed is printing, the 3D printing device can generally print directly in a primary scanning direction i.e., the primary printing direction, of a print head, so the printing speed of the object to be printed is the fastest in this direction, and the height of the object to be printed in this direction can be large. In a secondary scanning direction, i.e., the secondary printing direction, of the print head, it is necessary to perform operations such as reset and move of the print head, and thus the printing speed in this printing direction is slower. Therefore, a height of the object to be printed in the secondary printing direction is generally between a height of the primary printing direction and a height of the layer stacking direction. In this way, the orientation posture of the object to be printed is set according to the printing speeds in different directions, ensuring that the printing times of the object to be printed consumed in directions are less, and improving the overall printing speed.

In this embodiment, the 3D printing method specifically includes: first obtaining height groups of the object to be printed in multiple different postures relative to the support platform, where each of the height groups includes heights of the object to be printed in multiple different directions corresponding to the posture; then obtaining the first height having a minimum height, and the second height and the third height, which are orthogonal to the first height, from all of the height groups, where the second height and the third height are minimum heights in their respective directions; and finally taking directions in which the first height, the second height, and the third height are located as three printing directions of the object to be printed respectively, and printing. In this way, it is possible keep a printing direction with a slow printing speed consistent with a direction in which the object to be printed has a small height, by orienting the object to be printed, so that the printing time of the object to be printed consumed is reduced in each direction, and the overall printing speed is improved.

Embodiment 2

Figure 2:
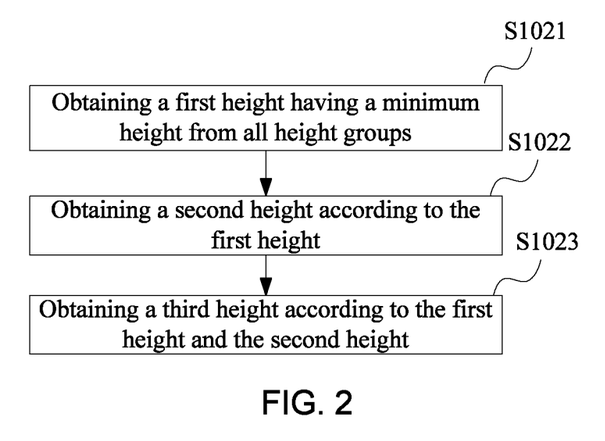
FIG. 2 is a schematic flowchart of obtaining a first height, a second height, and a third height from multiple height groups of an object to be printed according to Embodiment 2 of the disclosure.

After the multiple height groups of the object to be printed are obtained, when the first height, the second height, and the third height are to be obtained from the height groups, priorities may be set for different heights, and the first height, the second height and the third height are obtained in order according to the priorities. FIG. 2 is a schematic flowchart of obtaining a first height, a second height, and a third height from multiple height groups of an object to be printed according to Embodiment 2 of the disclosure. As shown in FIG. 2, specifically, in step S102, the following sub-steps may be specifically included.

S1021, obtaining a first height having a minimum height from all height groups.

Specifically, the first height is the minimum height in all height groups, so the direction in which it is located can be matched with the direction in which the printing speed is the slowest when printing the object to be printed, to save the printing time.

S1022, obtaining a second height according to the first height.

After the first height is obtained, a second height that is orthogonal to the first height and has a minimum height can be found from the height groups. The second height may be in the same height group as the first height (when the height groups include heights in multiple directions), or may be in a different height group from the first height (when the height groups include heights only in one direction). Where the first height obtained in previous step may be in one height group or multiple height groups. If only one height group includes the first height, the posture corresponding to the height group can be taken as the orientation posture of the object to be printed on the support platform, and at this time, the second height and the third height can be directly determined. If multiple height groups include the first height, directions that are perpendicular and orthogonal to the direction in which the first height is located are further obtained from the groups including the first height, and a direction with a minimum height is selected from the directions, which is the direction in which the second height is located.

In the case where the multiple height groups include the first height, in order to determine an unique first height, after obtaining the second height according to the first height, it is further needed to update the first height according to the obtained second height, that is, a first height corresponding to the second height obtained in this step is re-taken as the unique first height.

S1023, obtaining a third height according to the first height and the second height.

Similarly, after the second height is obtained, the third height orthogonal to the first height and the second height and having a minimum height value can be obtained according to the first height and the second height. If there are multiple height groups including the first height and the second height, a direction orthogonal to the directions of the first height and the second height and having a minimum height value may be further obtained from the groups including the first height and the second height, which is the direction in which the third height is located.

In addition, since the second height obtained in the previous step may also be multiple, after obtaining the third height according to the first height and the second height, the first height and the second height may be updated according to the third height, that is, the second height and the first height corresponding to the third height are reselected from the multiple second heights and first heights according to the obtained third height, and are confirmed as the first height and the first to be obtained.

According to the above steps, the first height, the second height, and the third height can be sequentially obtained, and it is ensured that the first height, the second height, and the third height are minimum values in their respective directions, so that the printing time consumed is the shortest when the object to be printed is oriented in the directions of these heights.

It will be understood by those skilled in the art that the third height having a minimum height may also be multiple on the basis of obtaining the first height and the second height. Since height values of all third heights are equal at this time, a fastest printing speed can be obtained regardless of posture in which the object to be printed is set, so that any one of the multiple third heights can be selected for subsequent printing.

In this embodiment, obtaining the first height, the second height, and the third height from the multiple height groups of the object to be printed specifically includes: first obtaining the first height having a minimum height from all height groups; then obtaining the second height according to the first height; and finally obtaining the third height according to the first height and the second height. In this way, the minimum heights in different directions can be sequentially obtained in these directions according to the different priorities, thereby ensuring that a slower printing speed can be matched with a shorter length, and then the length in the direction in which the printing speed of the object to be printed is the slowest is minimum when printing the object to be printed, so that the overall printing time is minimized.

Embodiment 3

Figure 3:
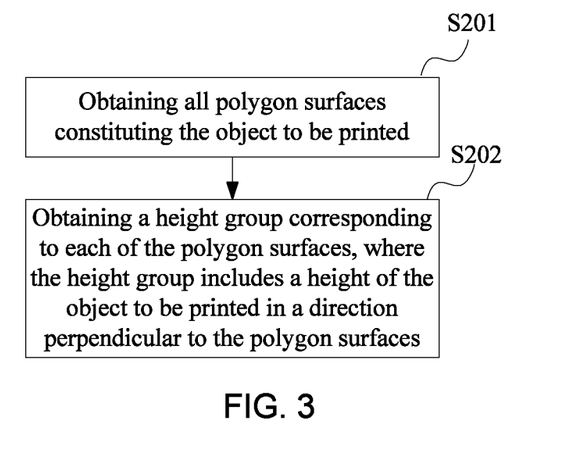
FIG. 3 is a schematic flowchart of obtaining height groups of an object to be printed according to Embodiment 3 of the disclosure.

On the basis of the foregoing Embodiment 2, when obtaining the multiple height groups of the object to be printed and obtaining the first height, the second height, and the third height from these height groups, the directions of the first height, the second height, and the third height can be determined by mesh partition on a model of the object to be printed and according to directions of mesh units. FIG. 3 is a schematic flowchart of obtaining the height groups of an object to be printed according to Embodiment 3 of the disclosure. As shown in FIG. 3, the step of obtaining the height groups of the object to be printed in multiple different postures relative to the support platform specifically includes:

S201, obtaining all polygon surfaces constituting the object to be printed.

Where the model of the object to be printed may be constituted by multiple polygon surfaces, and area sizes and the number of the polygon surfaces may be set according to needs and the processing capability of the 3D printing device. The larger the number of the polygon surfaces, the smaller the areas of individual polygon surfaces, and the more accurate the result of obtaining a model height of the object to be printed, and correspondingly the higher the processing capability required.

Specifically, the polygonal surfaces may be triangular surfaces or other shapes. Unless otherwise stated, the description will be made taking that the object to be printed is made of triangular surfaces as an example.

S202, obtaining a height group corresponding to each of the polygon surfaces, where the height group includes a height of the object to be printed in a direction perpendicular to the polygon surfaces.

Figure 4A:
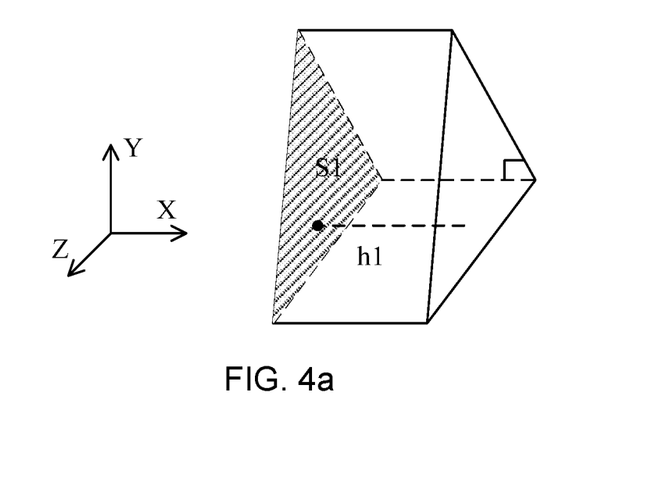
FIG. 4a is a schematic diagram of one triangular surface of the object to be printed and a corresponding model height thereof according to Embodiment 3 of the disclosure.
Figure 4B:
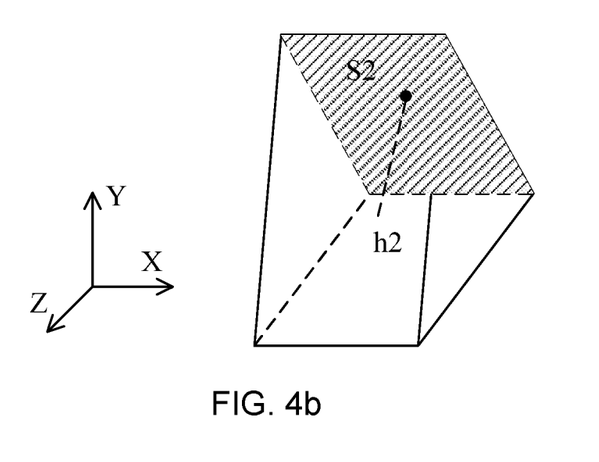
FIG. 4b is a schematic diagram of another triangular surface of the object to be printed and a corresponding model height thereof according to Embodiment 3 of the disclosure.

After all the triangular surfaces constituting the object to be printed are obtained, the triangular surfaces can be used as reference planes, and the heights of the object to be printed corresponding to the triangular surfaces, that is, maximum sizes of the object to be printed in directions perpendicular to the triangular surfaces, is determined. In addition, the height group further includes a direction of each polygon surface. As such, a height of the object to be printed in a direction perpendicular to a triangular surface, and a direction of the triangular surface, that is, a relative angle of the triangular surface relative to other triangular surfaces or the entire object to be printed, are included in a height group corresponding to the triangular surface, which facilitates a subsequent selection of the first height, second height and third height. For example, FIG. 4a is a schematic diagram of one triangular surface of the object to be printed and a corresponding model height thereof according to Embodiment 3 of the disclosure. As shown in FIG. 4a, one triangular surface of the object to be printed is S1, and a model height perpendicular to the triangular surface S1 is h1, and a size and a direction of the height h1 and an angle of the triangular surface S1 are included in a height group corresponding to the triangular surface. FIG. 4b is a schematic diagram of another triangular surface of the object to be printed and a corresponding model height thereof according to Embodiment 3 of the disclosure. As shown in FIG. 4b, another triangular surface S2 of the object to be printed, and a corresponding model height h2 may be selected, and a size and a direction of the model height h2, and an angle of the triangular surface S2 are included in a height group corresponding to the triangular surface S2.

Correspondingly, in the step of obtaining the first height, the second height, and the third height, the step of obtaining the minimum first height from all height groups, i.e., the step S1021, may specifically include obtaining a minimum height of the object to be printed in directions perpendicular to the polygon surfaces from all height groups, and taking the minimum height as the first height.

In this way, a minimum height can be determined by directly comparing heights of the object to be printed in directions perpendicular to the triangular surfaces, and the minimum height is taken as the first height. When the 3D printing device is printing, a printing direction with a minimum printing speed can be oriented as a direction in which the first height is located.

Figure 5:
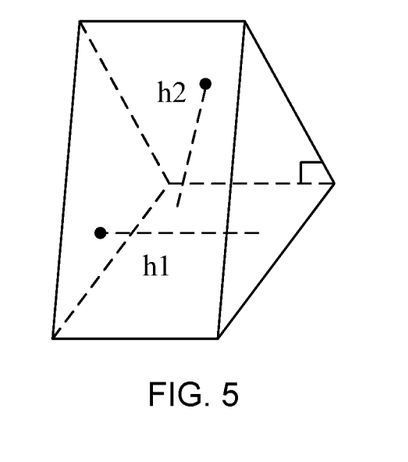
FIG. 5 is a schematic diagram of a relative relationship between a second height and a first height of the object to be printed according to Embodiment 3 of the disclosure.

FIG. 5 is a schematic diagram of a relative relationship between a second height and a first height of the object to be printed according to Embodiment 3 of the disclosure. As shown in FIG. 5, further, after obtaining the first height on the basis of the above step S1021, it is also necessary to find minimum heights in directions orthogonal to and perpendicular to the first height as the second height and the third height. In addition, if there are multiple height groups containing the minimum first height, further selection is needed to obtain a group having the second height. And the step of obtaining the second height according to the first height, i.e., the step S1022, may specifically include:

obtaining, from all of the height groups, a height orthogonal to a direction in which the first height is located and having a minimum length, and taking the height as the second height; or obtaining, from all of the height groups, heights approximately orthogonal to a direction in which the first height is located, and taking, from the heights approximately orthogonal to the direction in which the first height is located, a projection having a minimum length in the direction orthogonal to the first height as the second height.

Where the above steps may correspond to a case where a height in only one direction is included in each height group. Therefore, when the second height is selected, it is necessary to combine directions of the triangular surfaces in the height group, and find a height satisfying conditions from other height groups, and use it as the second height. As shown in FIG. 5, after the minimum first height h1 is obtained, when the second height is to be obtained, since the second height is orthogonal to the first height h1, triangular surfaces perpendicular to the triangular surface S1 on which the first height h1 is located can be selected according to directions of the triangular surfaces, so that heights corresponding to the selected triangular surfaces are perpendicular to and orthogonal to the first height h1. Then, among the heights corresponding to the selected triangular surfaces, there is one triangular surface S2 whose corresponding length or height value is the smallest, then a height h2 corresponding to the triangular surface S2 can be taken as the second height. In addition, since the object to be printed does not necessarily have a triangular surface perpendicular to and orthogonal to the triangular surface corresponding to the first height, when the second height is obtaining, heights of other triangular surfaces approximately perpendicular to the triangular surface corresponding to the first height may be used for judging. When a triangular surface is approximately perpendicular to the triangular surface corresponding to the first height, for example, at an angle of 80° or more, a height of this triangular surface is approximately orthogonal to the direction in which the first height is located. Thus, after finding all heights whose directions are approximately orthogonal to the first height, the heights can be projected in the direction orthogonal to the first height, and a projection having a minimum length is taken as the second height.

Similarly, if there is only one first height and one second height, a direction orthogonal to both the first height and the second height may be directly selected as the third height. And when there are multiple height groups including the minimum second height, on the basis of the above step S1022, further selection may also be performed from all height groups including the first height and the second height, to obtain a group including the third height. Specifically, the step of obtaining the third height according to the first height and the second height may specifically include: obtaining, from all of the height groups, a height orthogonal to the first height and the second height and having a minimum length, and taking the height as the third height; or obtaining, from all of the height groups, heights approximately orthogonal to the first height and the second height, and taking, from the heights approximately orthogonal to the first height and the second height, a projection having a minimum length in a direction orthogonal to the first height and the second height as the third height.

After obtaining the third height, if there is only one height group having the third height, the third height corresponding to the height group can be directly determined; and if there are multiple height groups having the third height, any one of these height groups may be selected to determine the third height.

In this embodiment, the 3D printing method specifically includes: first obtaining height groups of the object to be printed in multiple different postures relative to the support platform, where each of the height groups includes heights of the object to be printed in multiple different directions corresponding to the posture; then obtaining the first height having the minimum height, and the second height and the third height orthogonal to the first height from all of the height groups, where the second height and the third height are minimum heights in their respective directions; and finally taking directions in which the first height, the second height, and the third height are located as three printing directions of the object to be printed respectively, and printing. When obtaining the height groups corresponding to the different postures of the object to be printed, specifically, all polygon surfaces constituting the object to be printed are obtained, and a height group corresponding to each of the polygon surfaces is obtained, where the height group includes a height of the object to be printed in a direction perpendicular to a polygon surface, and a direction of each of the polygon surfaces. In this way, it is possible to keep a printing direction with a slow printing speed consistent with a direction in which the object to be printed has a small height, by orienting the object to be printed, so that the printing times of the object to be printed consumed in directions are reduced, and the overall printing speed is improved.

Embodiment 4

When the object to be printed is meshed and directions of the first height, the second height, and the third height are determined according to directions of mesh units, after the first height is obtained, since the first height and a corresponding polygon surface are perpendicular to each other, it is also possible to find corresponding second height and third height directly on the plane on which the polygon surface lies. At this time, the height group includes not only a height of the object to be printed in the direction perpendicular to the polygon surface, but also a projection of the object to be printed on the polygon surface. In this way, the projection of the object to be printed on the polygon surface can be used to obtain the second height and the third height. Specifically, when obtaining the multiple height groups of the object to be printed in the different postures, the step of obtaining the first height, the second height, and the third height may also include: first obtaining the minimum first height from all of the height groups; then obtaining the second height according to the first height; and finally obtaining the third height according to the first height and the second height.

Where the step of obtaining the minimum first height from all of the height groups may specifically include obtaining a minimum height of the object to be printed in directions perpendicular to the polygon surfaces from all of the height groups, and taking the minimum height as the first height.

Figure 6:
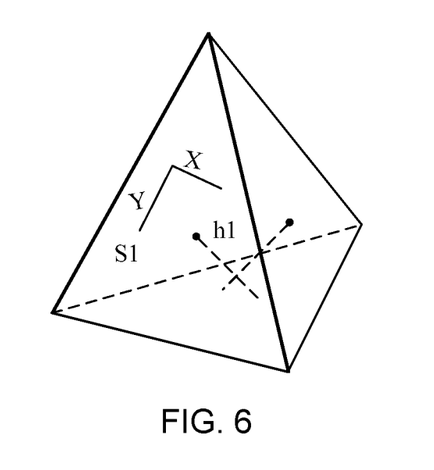
FIG. 6 is a schematic diagram of a first height and a corresponding triangular surface of an object to be printed according to Embodiment 4 of the disclosure.

In this way, a minimum height of the object to be printed can be determined directly by comparing heights of the object to be printed in the directions perpendicular to the triangular surfaces, and the minimum height is taken as the first height. When the 3D printing device is printing, a printing direction with a minimum printing speed can be oriented as a direction in which the first height is located. FIG. 6 is a schematic diagram of a first height and a corresponding triangular surface of an object to be printed according to Embodiment 4 of the disclosure. As shown in FIG. 6, assuming that the model height h1 corresponding to the triangular surface S1 is the minimum first height among heights corresponding to all of the triangular faces, when obtaining the second height and the third height, searching can be performed according to the first height h1.

Further, if there are multiple height groups including the minimum first height, it is necessary to perform further screening from all height groups including the first height by using the first height to obtain a group having the second height. The step of obtaining the second height according to the first height, i.e., the step S1022, may specifically include:

obtaining minimum lengths of projections of the object to be printed on polygon surfaces corresponding to the first height, and taking the minimum lengths of the projections as the second height.

Specifically, the step may specifically be: obtaining, from height groups having the first height, minimum lengths of projections of the object to be printed on polygon surfaces corresponding to the first height, and taking a minimum value of all of the minimum lengths as the second height.

Figure 7:
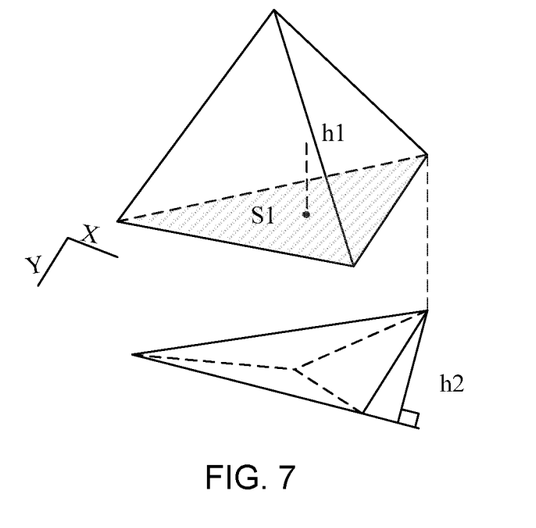
FIG. 7 is a schematic diagram of obtaining a second height according to the first height according to Embodiment 4 of the disclosure.

Since the first height and a corresponding polygonal surface are necessarily perpendicular to each other, when there are multiple minimum first height, the object to be printed can be projected on the polygon surfaces corresponding to these first heights, and the minimum lengths of projections of the object to be printed on the polygon surfaces can be found. Since the minimum lengths of the projections found are located on the polygonal surfaces, it is necessarily a mutually orthogonal relationship with the first heights corresponding to the polygonal surfaces where the minimum lengths of the projections are located, and the minimum lengths of the projections can be taken as the second height. FIG. 7 is a schematic diagram of obtaining a second height according to the first height according to Embodiment 4 of the disclosure. As shown in FIG. 7, after obtaining the first height h1 and the corresponding triangular surface S1, the triangular surface S1 can be used as a projection plane, and the entire object to be printed is projected onto the triangular surface S1. As such the projections of the object to be printed on the triangular surface S1 are all perpendicular to the first height h1, so that the minimum height h2 can be found from the projections and taken as the second height.

In addition, after obtaining the second height, the first height can be updated according to the second height, that is, the first height corresponding to the second height is selected and used as the required first height.

Similarly, on the basis of the above step S1022, if there are multiple height groups including the minimum first height and the minimum second height, a further screening may be also performed from the height groups according to the first height and the second height to obtain a group including the third height. Specifically, the step of obtaining the third height according to the first height and the second height, i.e., the step S1023, may specifically include:

taking a length of the projections perpendicular to directions of the first height and the second height as the third height.

In this way, among the projections of the object to be printed on the polygon surface corresponding to the first height, the length perpendicular to the directions of the first height and the second height can be taken as the third height.

Specifically, generally, when there is only one second height, the third height orthogonal to the first height and the second height and located on a projection surface can be directly determined through the first height and the second height. And when there are multiple second heights, since the third height corresponding to the first height and the second height may also be multiple, the step may be obtaining, from the height groups having the first height and the second height, a length, perpendicular to the directions of the first height and the second height in the projections of the object to be printed on the polygon surfaces corresponding to the first height and having a minimum length, as the third height.

After obtaining the third height, if there is only one height group having the third height, the third height corresponding to the height group can be directly determined; and if there are multiple height groups having the third height, any one of these height groups may be selected to determine the third height.

In this embodiment, the 3D printing method specifically includes: first obtaining height groups of the object to be printed in multiple different postures relative to the support platform, where each of the height groups includes heights of the object to be printed in multiple different directions corresponding to the posture; then obtaining the first height having the minimum height, and the second height and the third height orthogonal to the first height from all of the height groups, where the second height and the third height are minimum heights in their respective directions; and finally taking directions in which the first height, the second height, and the third height are located as three printing directions of the object to be printed respectively, and printing. When obtaining the height groups corresponding to the different postures of the object to be printed, after obtaining the first height, a minimum length in projections of the object to be printed on the polygon surfaces corresponding to the first height may be obtained, and the minimum length in the projections may be taken as the second height, and a length orthogonal the first height and the second height in the projections may be taken as the third height. In this way, it is possible to keep a printing direction with a slow printing speed consistent with a direction in which the object to be printed has a small height by orienting the object to be printed, so that the printing times of the object to be printed consumed in directions are reduced, and the overall printing speed is improved.

Embodiment 5

Figure 8:
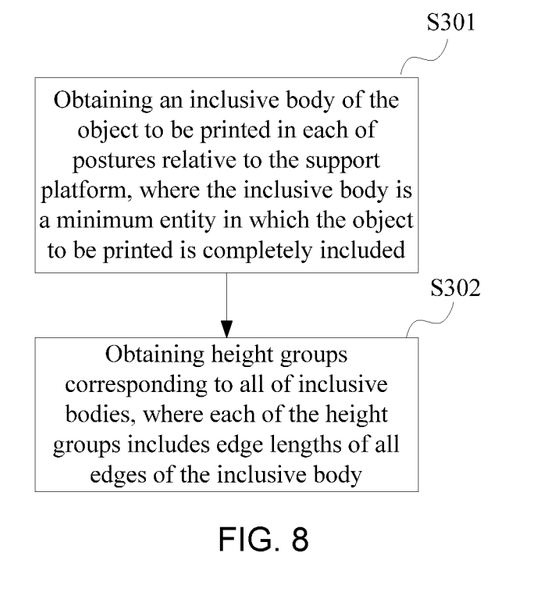
FIG. 8 is another schematic flowchart of obtaining height groups of an object to be printed according to Embodiment 5 of the disclosure.

On the basis of the foregoing Embodiment 2, when obtaining the multiple height groups of the object to be printed and obtaining the first height, the second height, and the third height from these height groups, a circumscribed shape of the object to be printed may also be utilized to determine the height groups. FIG. 8 is another schematic flowchart of obtaining height groups of an object to be printed according to Embodiment 5 of the disclosure. As shown in FIG. 8, obtaining the height groups of the object to be printed in multiple different postures relative to the support platform may specifically include:

S301, obtaining an inclusive body of the object to be printed in each of postures relative to the support platform, where the inclusive body is a minimum entity in which the object to be printed is completely included.

Where since the object to be printed is usually in an irregular shape, inclusive bodies corresponding to the object to be printed in different orientation postures can be established, and sizes and directions of the inclusive body are used to judge a length of the object to be printed in each direction. Specifically, in order to facilitate corresponding to printing directions that are perpendicular to each other, the inclusive body may generally be a cuboid whose edges are perpendicular to each other, and the cuboid is circumscribed with the object to be printed.

In this way, the object to be printed correspondingly has a cuboid in which the object to be printed is capable of being completely included and which has a shortest length in each direction, in each different posture or at each different angle relative to the support platform.

Each cuboid is relatively rotated by a small angle relative to the other cuboids so as to traverse every possible orientation posture of the object to be printed.

Figure 9:
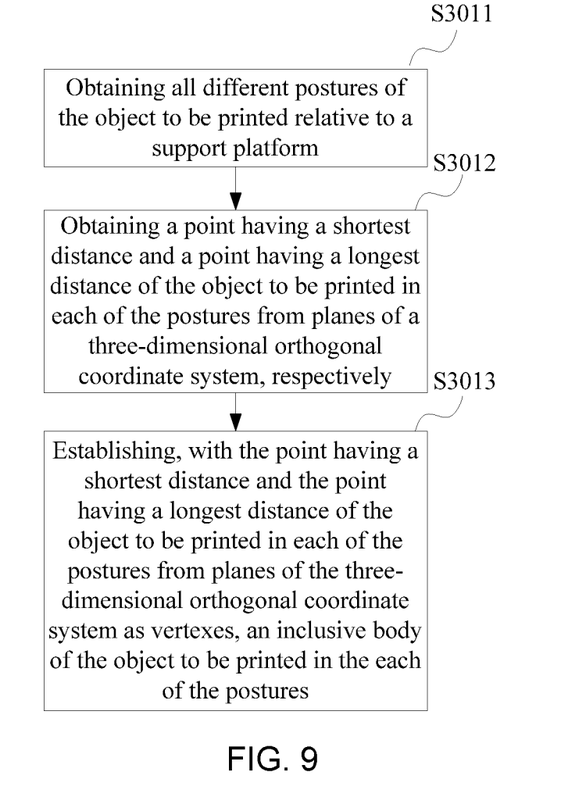
FIG. 9 is a schematic flowchart of obtaining inclusive bodies in different postures of the object to be printed according to Embodiment 5 of the disclosure.

Specifically, FIG. 9 is a schematic flowchart of obtaining inclusive bodies in different postures of the object to be printed according to Embodiment 5 of the disclosure. As shown in FIG. 9, when an inclusive body is a circumscribed cuboid of the object to be printed, the step of obtaining the inclusive body of the object to be printed in each of the postures relative to the support platform may be specifically divided into the following sub-steps:

S3011, obtaining all different postures of the object to be printed relative to a support platform;

S3012, obtaining a point having a shortest distance and a point having a longest distance of the object to be printed in each of the postures from planes of a three-dimensional orthogonal coordinate system, respectively; and S3013, establishing, with the point having a shortest distance and the point having a longest distance of the object to be printed in each of the postures from planes of the three-dimensional orthogonal coordinate system as vertexes, an inclusive body of the object to be printed in the each of the postures.

Figure 10:
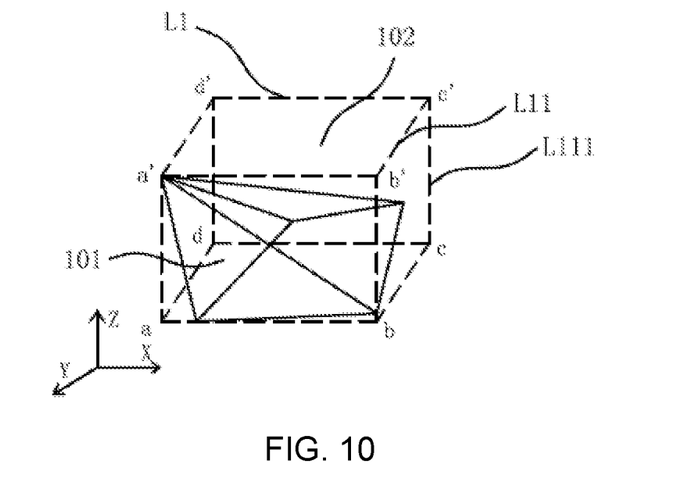
FIG. 10 is a schematic diagram of the object to be printed and an inclusive body thereof at an angle according to Embodiment 5 of the disclosure.

Specifically, FIG. 10 is a schematic diagram of the object to be printed and an inclusive body thereof at an angle according to Embodiment 5 of the disclosure. As shown in FIG. 10, it is assumed that the three-dimensional orthogonal coordinate system is an XYZ coordinate system and includes three mutually perpendicular planes: an X-Y plane, an X-Z plane, and a Y-Z plane. Arbitrarily selecting a posture of the object to be printed, according to the step S3012, a closest point D1 (x1, y1, z1) and a farthest point D1' (x1', y1', z1') to the X-Y plane, a closest point D2 (x2, y2, z2) and a farthest point D2' (x2', y2', z2') to the Y-Z plane, and a closest point D3 (x3, y3, z3) and a farthest point D3' (x3', y3', z3') to the X-Z plane of the three-dimensional orthogonal coordinate system on the object to be printed may be respectively obtained in the posture.

In the step S3013, the six points D1, D1', D2, D2', D3, D3' can be used as vertexes to determine a circumscribed cuboid of the object to be printed. Specifically, FIG. 10 shows an object to be printed 101 and its circumscribed inclusive body, i.e., a cuboid 102. The vertexes of the circumscribed cuboid 102 are a (x2, y3, z1), b (x2', y3, z1), c(x2', y3', z1), d(x2, y3', z1), a'(x2, y3, z1'), b'(x2', y3, z1'), c'(x2', y3', z1'), d'(x2, y3', z1'), respectively. The edges of the cuboid 102 can be obtained according to the eight vertexes, which are L1=x2'-x2, L11=y3'-y3, L111=z1'-z1, respectively.

S302, obtaining height groups corresponding to all of inclusive bodies, where each of the height groups includes edge lengths of all edges of the inclusive body.

Figure 11:
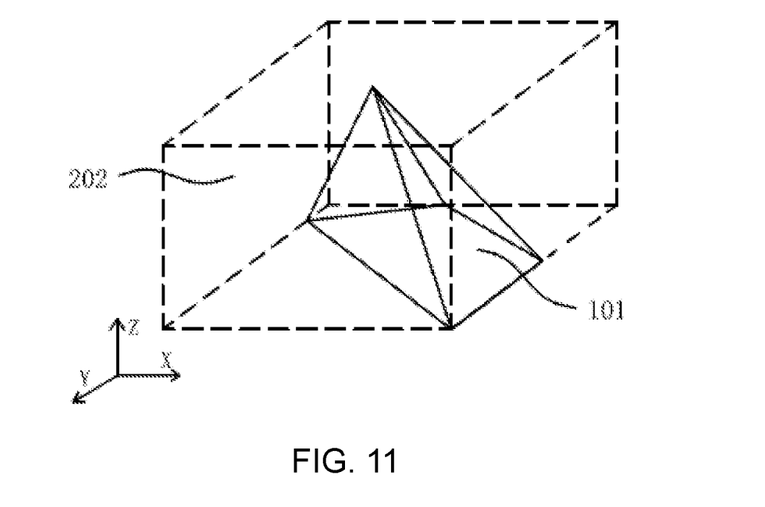
FIG. 11 is a schematic diagram of the object to be printed and an inclusive body thereof at another angle according to Embodiment 5 of the disclosure.

Still taking the object to be printed 101 as an example, the object to be printed can be rotated by a predetermined angle in any one of the X, Y, and Z directions, so that the object to be printed presents a different posture. FIG. 11 is a schematic diagram of the object to be printed and an inclusive body thereof at another angle according to Embodiment 5 of the disclosure. As shown in FIG. 11, it shows the object to be printed 101 and an inclusive body 202 thereof obtained at another angle. By repeating the above steps S3011 to S3013, the edge lengths of edges of the circumscribed cuboids of different orientations of the object to be printed can be obtained.

For example, the posture of the object to be printed can be adjusted in unit of 1°. Where first, the object to be printed may be rotated by 1° around the X direction in the three-dimensional orthogonal coordinate system to obtain all circumscribed cuboids of the object to be printed at 360 orientations in the X direction; and then in each orientation posture along the X direction, the object to be printed is rotated by 1° around the Y direction, thereby obtaining all 360*360 circumscribed cuboids of the object to be printed in the X direction and the Y direction; and finally the object to be printed is rotated by 1° around the Z direction in each postures of the X direction and the Y direction to obtain all 360*360*360 circumscribed cuboids of the object to be printed in the X direction, Y direction, and Z direction. The height groups corresponding to these circumscribed cuboids includes all edge lengths of the circumscribed cuboids, so as to obtain the required first height, second height, and third height in subsequent calculations.

Then, similar to the method in the foregoing Embodiment 3, on the basis of the foregoing Embodiment 2, the step S1021 of obtaining a minimum first height from all height groups may specifically include: obtaining an edge having a minimum length from all of inclusive bodies and taking an edge length of the edge having a minimum length as the first height.

Since edge lengths of an inclusive body represent largest outer sizes of the object to be printed, the minimum first height of the object to be printed can be obtained by selecting the edge having the minimum length of the inclusive body.

Further, after obtaining the first height, if there are multiple height groups including the first height, it is necessary to perform further screening from all height groups including the first height to obtain a group having the second height. The step S1022 of obtaining the second height orthogonal to the direction in which the first height is located and having a minimum height from the height groups having the first height may specifically include: obtaining, from the height groups having the first height, an edge that has a direction different from the first height and has a minimum length, among edges of the inclusive body, and taking an edge length of the edge that has a direction different from the first height and has a minimum length as the second height.

Where since the inclusive body is a cuboid, the edges of the inclusive body are perpendicular to each other, so that it is relatively easy to select the edge that has a direction different from the first height and has a minimum length from the edges of the inclusive body, and the edge length of the edge is taken as the second height, and the orientation of the edge is taken as a direction of the second height.

Similarly, when there are multiple height groups including the second height, the step S1023 of obtaining the third height orthogonal to the directions of the first height and the second height and having a minimum height from the height groups having the first height and the second height may specifically include: obtaining, from height groups having the first height and the second height, an edge that has a direction different from the first height and the second height, of the inclusive body, and taking an edge length of the edge that has a direction different from the first height and the second height as the third height.

After the first height, the second height and the third height are determined in this way, the optimal posture that the object to be printed presents relative to the support platform can be determined according to the directions of these heights. The object to be printed is printed according to the optimal posture, which can ensure that the object to be printed has a small size in a printing direction in which the printing speed is the slowest, and the overall printing time is reduced.

In this embodiment, the 3D printing method specifically includes: first obtaining height groups of the object to be printed in multiple different postures relative to the support platform, where each of the height groups includes heights of the object to be printed in multiple different directions corresponding to the posture; then obtaining the first height having the minimum height, and the second height and the third height orthogonal to the first height from all of the height groups, where the second height and the third height are minimum heights in their respective directions; and finally taking directions in which the first height, the second height, and the third height are located as three printing directions of the object to be printed respectively, and printing. When obtaining the height groups in the different postures of the object to be printed, the inclusive body of the object to be printed in each of the postures relative to the support platform may be first obtained, where the inclusive body is a minimum entity in which the object to be printed is completely included; and then the height groups corresponding to all of the inclusive bodies are obtained, where each of the height groups includes edge lengths of all edges of the inclusive body. In this way, it is possible to keep a printing direction with a slow printing speed consistent with a direction in which the object to be printed has a small height by orienting the object to be printed, so that the printing times of the object to be printed consumed in directions are reduced, and the overall printing speed is improved.

Embodiment 6

Figure 12:
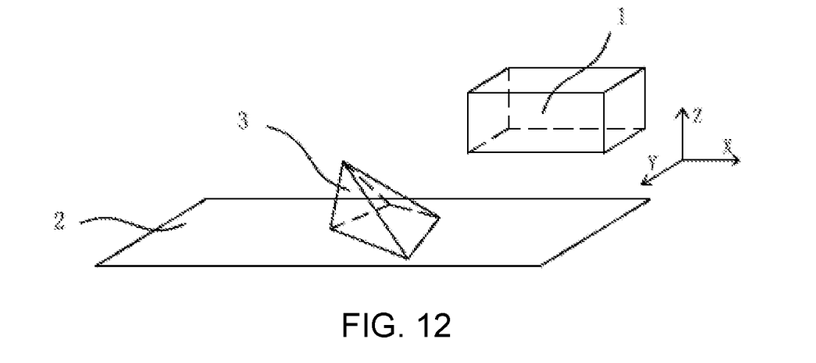
FIG. 12 is a schematic structural diagram of a 3D printing device according to Embodiment 6 of the disclosure.

The disclosure further provides a 3D printing device that can be used to perform the 3D printing methods in the foregoing Embodiments 1 to 5. FIG. 12 is a schematic structural diagram of the 3D printing device according to Embodiment 6 of the disclosure. As shown in FIG. 12, the 3D printing device provided in this embodiment specifically includes a print head 1, a support platform 2, and a control unit (not shown). The control unit and the print head 1 are electrically connected, and the control unit is configured to perform the 3D printing methods described in Embodiments 1 to 5, so that the print head 1 prints the object to be printed 3 on the support platform 2. Where the process steps of the 3D printing method have been described in detail in the foregoing Embodiments 1 to 5, and are not described herein again.

Specifically, the control unit may include components such as a processing terminal and a drive controller, and the processing terminal may be configured to process the object to be printed 3 to form print data for printing, and the drive controller controls the print head 1 to print on the support platform 2 through instructions issued by the processing terminal. The instructions issued by the processing terminal include orienting the printing of the object to be printed according to method processes of Embodiments 1 to 5. The object to be printed 3 has different lengths in different directions. Specifically, the orientation of the object to be printed 3 should satisfy that the length of the object to be printed in the layer stacking direction <the length in the secondary scanning direction of the print head <the length in the primary scanning direction of the print head.

Since the orientation posture determined to the object to be printed 3 may not match with an actual center of gravity of the object to be printed 3, the processing terminal is further configured to generate a support structure of the object to be printed 3 so as to support a hanging portion of the object to be printed 3 at the time of printing.

After determining the posture and orientation of the object to be printed 3 on the support platform 2, a layering processing is performed on the object to be printed 3 including the support structure, and then layer print data of each layer is sent to the drive controller for controlling the print head 1 to print, and finally multiple layers are superimposed to form the object to be printed 3.

Specifically, in order to further shorten the processing time of data of the processing terminal, the 3D printing method of Embodiments 1 to 5 may be simultaneously operated with the layering processing. Specifically, after the first height is determined from the height groups corresponding to different postures of the object to be printed 3, the support structure for the object to be printed 3 may be generated, and then a layering processing is performed on the object to be printed 3 including the support structure so as to determine the second height and the third height of the object to be printed 3, and finally, the layer print data of each layer is sent to the drive controller after a corresponding conversion, so that the print head 1 is controlled to print, and after multiple layers superimposing, the object to be printed 3 is formed.

Specifically, the layering processing may be: converting the object to be printed 3 into a data form, where information of the object to be printed 3 can be obtained by scanning, and then the information contained in the object to be printed 3 is converted into a data format that can be recognized by a layered slice software of the processing terminal, such as STL format, PLY format, WRL format, and the like. Specifically, the information contained in the object to be printed 3 takes a layer as an unit, that is, the object to be printed 3 is scanned and converted into a data format that can be recognized by the layered slice software of the processing terminal, and then slicing and layering are performed through the layered slice software, and then each sliced layer is parsed to obtain layer information of each layer, and then the layer information of each layer is converted into layer print data.

Specifically, the layer print data includes, but is not limited to, layer structured data and layer unstructured data, and the layer structured data includes, but is not limited to, column structured data, network format structured data, spiral structured data, and other information, and layer unstructured data includes, but is not limited to, materials, colors and other information.

Specifically, the layer unstructured information of the object to be printed 3 is obtained while parsing the layer structure information of the sliced layer of the object to be printed 3.

As a variant, the material information of the layer unstructured information can be set according to specific needs; the color information of the layer unstructured information can also directly draw the object to be printed 3 through drawing software, and commonly used drawing software includes such as: CAD, Proe, Solidwork, UG, 3DMax, etc. As understood by those skilled in the art, what is drawn by the drawing software is a basic structural model of the object to be printed 3. Those skilled in the art can make various changes on the basis of the prior art, which will not be described herein.

As a variant, the object to be printed 3 may be printed from a single material or multiple materials, may be a single-color or multi-color object, or the like. Properties, such as material type, color information, and the like, of the object to be printed 3 in the disclosure are not limited.

Specifically, the above materials include a support material and a molding material. The support material includes, but is not limited to, a material having a certain chemical property or physical property such as a hot melt material, a water soluble material, or the like. The molding material includes, but is not limited to, a material having a certain chemical property or physical property such as a photocurable material, a temperature curable material, a rigid material, a flexible material, or the like.

In order to further shorten the printing time of the object to be printed 3, the layering process is simultaneously operated with the driver controller controlling the print head 1 to print. A specific implementation is: after the processing terminal obtains first layer print data of the object to be printed 3, while obtaining second layer print data, the first layer print data is sent to the drive controller for controlling the print head 1 to print, and so on, and finally multiple layers are superimposed to form the object to be printed 3.

Further, functions of the processing terminal and the drive controller may be the implemented by hardware, software executed by a processor, or a combination of the two. Specifically, if it is implemented by software modules, a pre-program can be burned into the processor, or the software can be installed into a preset system; if it is implemented by hardware, a field programmable gate array (FPGA) can be utilized to immobilize corresponding functions for realizing.

Further, the software modules may be stored in RAM memory, flash memory, ROM memory, EPROM memory, hard disk, or any other form of storage medium known in the art. By coupling the storage medium to a processor, the processor is capable of reading information from the storage medium and can write information to the storage medium. As a variant, the storage medium may be a part of a processor, or the processor and the storage medium are both located on an application specific integrated circuit (ASIC).

Further, the hardware may be a general purpose processor, a digital signal processor (DSP), an application specific integrated circuit (ASIC), a field programmable gate array (FPGA) or other programmable logic device, a discrete gate or a transistor logic device, a discrete hardware component, or a combination of these hardware, which are capable of implementing specific functions. As a variant, it can also be implemented by a combination of computing devices, such as a combination of a DSP and a microprocessor, a combination of multiple microprocessors, a combination of one or more microprocessors that are in communication with a DSP, and the like.

In this embodiment, the 3D printing device specifically includes the print head, the support platform and the control unit, the control unit and the print head are electrically connected, and the control unit is configured to perform the 3D printing method, so that the print head prints the object to be printed on the support platform; where the 3D printing method specifically includes: first obtaining height groups of the object to be printed in multiple different postures relative to the support platform, where each of the height groups includes heights of the object to be printed in multiple different directions corresponding to the posture; then obtaining the first height having the minimum height, and the second height and the third height orthogonal to the first height from all of the height groups, where the second height and the third height are minimum heights in their respective directions; and finally taking directions in which the first height, the second height, and the third height are located as three printing directions of the object to be printed respectively, and printing. In this way, it is possible to keep a printing direction with a slow printing speed consistent with a direction in which the object to be printed has a small height, by orienting the object to be printed, so that the printing times of the object to be printed consumed in directions are reduced, and the overall printing speed is improved.

Those skilled in the art will understand that all or part of the steps to implement the method embodiments described above may be accomplished by hardware related to program instructions. The aforementioned program may be stored in a computer readable storage medium. The program, when executed, performs the steps included in the foregoing method embodiments; and the foregoing storage medium includes various media that can store program codes, such as a ROM, a RAM, a magnetic disk, or an optical disk.

Finally, it should be noted that the above embodiments are merely used to illustrate the technical solutions of the disclosure, rather than limiting them. Although the disclosure has been described in detail with reference to the foregoing embodiments, those skilled in the art should understand that the technical solutions described in the foregoing embodiments may be modified, or some or all of the technical features therein may be equivalently substituted; and these modifications or substitutions do not make the essence of the corresponding technical solutions deviate from the scope of the technical solutions of the embodiments of the disclosure.

What is claimed is:

1. A 3D printing method, comprising:

obtaining, by a controller of a 3D printing device, multiple size groups corresponding to multiple postures of an object to be printed relative to a support platform; wherein each of the multiple size groups comprises a maximum size of the object measured in a first direction, a maximum size of the object measured in a second direction and a maximum size of the object measured in a third direction, and the first direction, the second direction and the third direction are orthogonal to each other;

selecting, by the controller of the 3D printing device, a size, a value of which is minimum, from all sizes in the multiple size groups as a first size;

in a condition that the number of the first size is one, determining, by the controller of the 3D printing device, a first size group comprising the first size; and taking, by the controller of the 3D printing device, directions in which three sizes in the first size group are located as three printing directions of the object for printing;

in a condition that the number of the first size is at least two, determining, by the controller of the 3D printing device, at least two first size groups in which each of the at least two first size groups comprises the first size; and selecting a size, a direction of which is orthogonal to directions in which the first sizes are located and a value of which is minimum in the at least two first size groups as a second size;

in a condition that the number of the second size is one, determining, by the controller of the 3D printing device, a second size group comprising the second size; and taking, by the controller of the 3D printing device, directions in which three sizes in the second size group are located as three printing directions of the object for printing;

in a condition that the number of the second size is at least two, determining, by the controller of the 3D printing device, at least two second size groups in which each of the at least two second size groups comprises the second size; and selecting a size, a direction of which is orthogonal to directions in which the first sizes and the second sizes are located and a value of which is minimum in the at least two second size groups as a third size; determining, by the controller of the 3D printing device, a third size group comprising the third size; and taking, by the controller of the 3D printing device, directions in which three sizes in the third size group are located as three printing directions of the object for printing; and controlling, by the controller of the 3D printing device, a print head to print the object on the support platform.

2. The 3D printing method according to claim 1, wherein the taking, by the controller of the 3D printing device, directions in which three sizes in the first size group are located as three printing directions of the object for printing comprises:

taking a direction in which a size, a value of which is minimum in the three sizes in the first size group, is located as a layer stacking direction of the object, a direction in which a size, a value of which is medium in the three sizes in the first size group, is located as a secondary printing direction of the object, and a direction in which a size, a value of which is maximum in the three sizes in the first size group, is located as a primary printing direction of the object for printing; or the taking, by the controller of the 3D printing device, directions in which three sizes in the second size group are located as three printing directions of the object for printing comprises:

taking a direction in which a size, a value of which is minimum in the three sizes in the second size group, is located as a layer stacking direction of the object, a direction in which a size, a value of which is medium in the three sizes in the second size group, is located as a secondary printing direction of the object, and a direction in which a size, a value of which is maximum in the three sizes in the second size group, is located as a primary printing direction of the object for printing; or the taking, by the controller of the 3D printing device, directions in which three sizes in the third size group are located as three printing directions of the object for printing comprises:

taking a direction in which a size, a value of which is minimum in the three sizes in the third size group, is located as a layer stacking direction of the object, a direction in which a size, a value of which is medium in the three sizes in the third size group, is located as a secondary printing direction of the object, and a direction in which a size, a value of which is maximum in the three sizes in the third size group, is located as a primary printing direction of the object for printing.

3. A 3D printing device, comprising: a print head, a support platform and a control unit, wherein the control unit and the print head are electrically connected, and the control unit is configured to perform the 3D printing method according to claim 1 to cause the print head to print the object to be printed on the support platform.

* * * * *